United States Patent [19]
Zortea et al.

[11] Patent Number: 6,047,032
[45] Date of Patent: Apr. 4, 2000

[54] SIGNAL EQUALIZATION AND DATA RECOVERY WITH NON-LINEAR DIGITAL THRESHOLD FEEDBACK

[75] Inventors: Anthony E. Zortea, Pipersville; Todd A. Wey, Schwenksville, both of Pa.

[73] Assignee: Integrated Circuit Systems, Inc., Valley Forge, Pa.

[21] Appl. No.: 08/965,835

[22] Filed: Nov. 7, 1997

[51] Int. Cl.[7] .......................... H04L 25/06; H04L 25/34; G01R 29/02
[52] U.S. Cl. .............................. 375/317; 375/286; 327/37
[58] Field of Search ...................... 375/317, 229, 375/233, 286, 287, 288, 346, 252; 327/91, 93, 94, 72, 87, 95, 37, 80; 342/91

[56] References Cited

U.S. PATENT DOCUMENTS

| | | | |
|---|---|---|---|
| 5,113,391 | 5/1992 | Gupta et al. | 370/540 |
| 5,132,797 | 7/1992 | Citta et al. | 358/167 |
| 5,450,441 | 9/1995 | Harris et al. | 375/224 |
| 5,832,039 | 11/1998 | Rijns et al. | 375/317 |

*Primary Examiner*—Chi H. Pham
*Assistant Examiner*—Khai Tran
*Attorney, Agent, or Firm*—Skjerven, Morrill, MacPherson, Franklin and Friel LLP

[57] ABSTRACT

In a digital communication system, analog equalization and data recovery are provided with non-linear digital feedback at the receiver, to overcome frequency domain distortion imposed by the communications channel. Digital information from the clock and data recovery circuit is non-linearly filtered and then fed back so as to modulate the threshold of a slicer which receives the signal which has been analog equalized. Thereby any shortcomings in the equalization, slicer, or clock and data recovery are overcome by adjusting the slicer threshold at each clock cycle in response to the recovered clock and data signals.

10 Claims, 4 Drawing Sheets

SIGNAL EQUALIZATION AND DATA RECOVERY WITH NON-LINEAR DIGITAL THRESHOLD FEEDBACK

BACKGROUND OF THE INVENTION

1. Field of the Invention

This invention relates to digital communications and more specifically to an equalizing and data recovery method and apparatus for eliminating in a receiver frequency domain distortion introduced by a transmission channel.

2. Description of the Prior Art

As is well known in the digital communications (e.g. computer data transmission) field, a basic problem is frequency domain distortion and noise introduced by the transmission channel. A transmission channel is for instance a telephone line, microwave relay, coaxial cable or satellite link. At the receiver end of the transmission channel, the received analog signal is equalized and the digital data recovered. Equalization is the well known process of removing distortion in the frequency domain, thereby overcoming the distorting affects of the transmission channel. Data recovery is the process of extracting a digital signal from the equalized analog signal. Typically for a single transmission channel system, a synchronizing clock signal is first recovered from the received signal prior to recovering the data signal.

Most transmission channel types cause complex frequency domain distortion such that it is difficult and expensive to implement an exact inverse thereof for equalization. Hence, the usual approach, which is to settle for less than optimum equalization, renders both clock and data recovery more difficult and lowers the tolerance of the system to noise, thus increasing the bit error rate (BER).

One approach in the prior art is an equalizer that is as close as possible to the transmission channel inverse. Such an apparatus reverses the frequency domain distortions imposed by the channel and also makes the data recovery circuit as tolerant as possible to whatever flaws are present in the equalizer. This solution has been found generally to be inferior because it increases the difficulty and therefore the expense of implementing both the equalizer and the data recovery circuits.

FIG. 1 shows a feedback equalizer apparatus 10 which is the receiver end of a digital transmission system. A transmitter 12 which receives e.g. computer data for transmission along for instance a coaxial cable transmission channel 16 transmits digital data along the transmission channel 16 to receiver 10. The receiver 10 includes a number of elements. The received signal is first subject to an analog equalization by equalizer 18 which is a rough attempt to reverse the effects of the distortion, in the frequency domain, introduced by the transmission channel.

In order to minimize the cost of the equalizer 18, the equalizer 18 performs only an approximation of an inverse of the effects of the channel 16. The output signal from the equalizer 18, which is an analog signal, is then applied to the input terminal of a slicer 22 which is a decision-making element. The slicer 22 receives the signal output from the equalizer 18 and outputs a signal, e.g. on a two-level bus. The equalizer is typically an analog high pass filter and the slicer is an analog circuit which merely decides in which range (of possibly many, e.g. three) the analog signal falls and outputs a value to indicate the range.

The signal output from the slicer 22 is provided to a clock and data recovery circuit 26 which independently recovers the synchronizing clock signals and the digital data signals from the sliced signal. The data recovery is accomplished by sampling the sliced signal at a fixed clock rate determined by the recovered clock signal. In addition, a feedback filter element 28 is present whereby the output signal from the slicer 22 is subject to a digital linear filter 28 and summed back by summer 32 to the signal output by the equalizer 18. This process is intended to improve the quality of the equalization. However this process suffers from the need to know the gain of the equalizer 18, any distortion introduced by the summer 32, and also by any limitations in the filter 28. This process also does not include the actual clock and data recovery circuit 26 in the feedback loop and hence it is unable to correct problems in clock data recovery and has been found to be inadequate. Also the filter 28 by its nature requires special filter coefficients which are difficult to implement in typical digital circuitry. Also this technique requires minimum time delay through the feedback equalizer, which however is difficult to achieve. Hence this implementation is relatively complex.

Also, the present inventors have determined that the prior art approach suffers from the drawback shown in FIG. 2 where the slicer threshold values are fixed. FIG. 2 shows a waveform where the vertical axis is amplitude (voltage) and the horizontal axis is time, as applied to slicer 22 in FIG. 1. There are two slicer thresholds P (positive) and N (negative); pulse X is a negative pulse of low amplitude and above the threshold N (e.g. due to signal drift caused by long pulse Y and an equalizer that is not the exact inverse of the cable) and hence undesirably is missed (not detected) by the slicer.

Therefore there are no known means in the prior art to accomplish accurate equalization and data recovery (providing a signal with a low number of error bits) in a relatively economical implementation.

SUMMARY

In accordance with this invention in a receiver for receiving digital data, the digital information output from a clock and data recovery circuit is non-linearly filtered and then the signal resulting of the non-linear filtering is fed back to modulate the slicer threshold. Thereby the non-linear digital filter can overcome shortcomings in the equalizer, slicer, and clock and data recovery circuit. In addition, the actual gain of the equalizer is not important and no summer is necessary in the feedback loop. Also it is possible to accomplish this with a relatively simple digital filter, thereby making implementation relatively inexpensive.

In one embodiment the present non-linear digital filter includes a number, for instance 32, of serially coupled delay elements with a weighted tap coupled to the output terminal of each delay element, and a summer for summing the output signals from all the taps. In a three level system, such as the MLT3 signal used in Fast Ethernet, there are two slicer thresholds; one for +1's and one for -1's. Such a filter structure is provided for both the +1 and -1 slicer outputs. The summed positive and negative 1's are subject to a nonlinear rounder which rounds, for instance, each 6 bit summed value to a 3 bit value. The two 3 bit values are then used to respectively adjust the positive and the negative threshold of the slicer. This threshold modulation feedback in one embodiment occurs at each clock cycle of the slicer. The filter and rounder account for the known deficiencies in the simple equalizer. The deficiencies can be understood by examining FIG. 2. The non-ideal equalizer exhibits "drift" in the signal when a relatively long pulse Z comes along. When Z causes enough drift, pulses that follow, such as X, can be missed by the slicer. In this example, it can be seen that if P and N were modulated by some short term average of the signal, the slicer output would improve The non-linear digital filter coefficients and rounder may take any one of the number of forms; in one embodiment all the filter coefficients are equal, making implementation relatively inexpensive.

DETAILED DESCRIPTION

Figure 3:
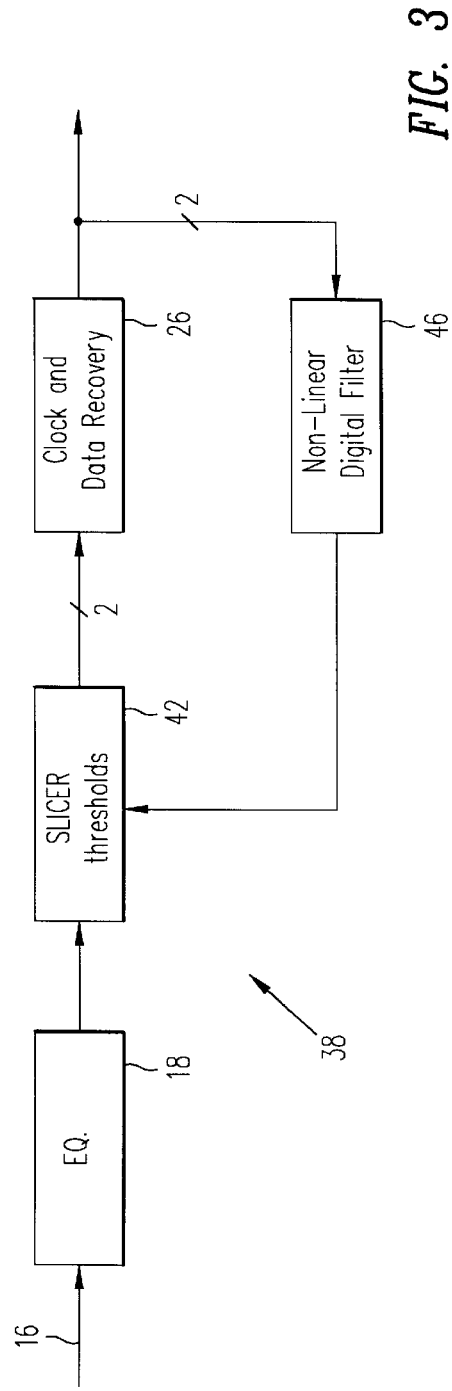
FIG. 3 shows a feedback equalizer apparatus in accordance with this invention.

FIG. 3 shows a block diagram of a receiver circuit 38 providing analog equalization and data recovery with non-linear digital feedback in accordance with this invention. FIG. 3 shows only the receiver portion of the communications system, the remainder of which is identical to that of FIG. 1. A typical application is in Fast Ethernet where the channel 16 is a unshielded twisted pair cable and the receiver 38 is the interface between the cable 16 and a computer device (not shown). However this is not limiting. Note that a cable 16 functions like a low pass filter. However the present equalization method and apparatus is also applicable to other types of systems and is independent of the actual nature of the distorting effects of the channel 16.

Figure 1:
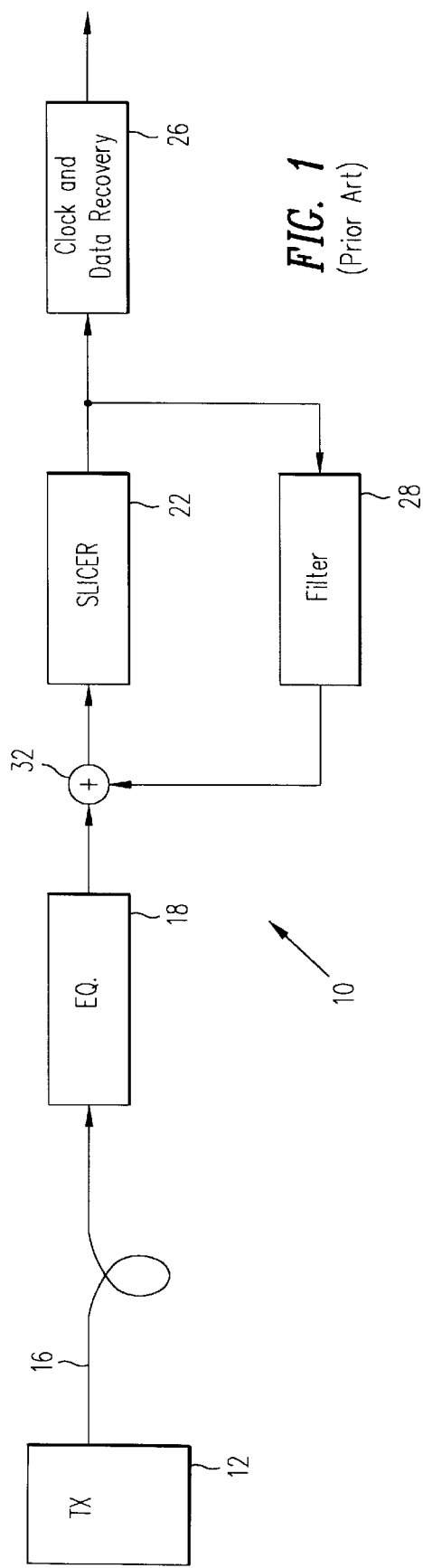
FIG. 1 shows a prior art feedback equalizer apparatus.

In FIG. 3, the analog equalization circuit 18 is similar to that of FIG. 1 and typically attempts to reverse the effect of the (low pass) filtering of the channel 16. The actual design of this equalizer 18 is of course dependent upon an analysis of the frequency distorting effects of the channel 16. In accordance with the invention any shortcomings in analog equalizer 18 are overcome; hence the exact design of the analog equalizer 18 is relatively non-critical. In the above example where the channel 16 functions as a low pass filter, typically the equalizer 18, to inverse the effects thereof, functions as a high pass filter; this is merely illustrative.

The analog output signal from the equalizer 18 is then coupled to the slicer 42, which is an analog device that slices the equalized signal at two variable thresholds. The threshold values of the slicer, both for positive and negative thresholds, are periodically varied; otherwise slicer 42 is conventional. The periodicity is typically the clock rate in the received signal, but this is not limiting. This is accomplished by the feedback loop shown in FIG. 3 whereby the output of the slicer 42, as in FIG. 1, is coupled to the input terminal of a conventional clock and data recovery circuit 26. Circuit 26 accomplishes the conventional conversion needed to produce a recovered output digital data synchronous to a clock signal from the sliced signal. However the output signal from the clock and data recovery circuit 26, unlike in FIG. 1, is part of the feedback loop involving filter 46. By including all receiver functions in the feedback loop, this advantageously improves performance of the entire receiver. Thus the equalized, sliced and recovered clock and data signals are all subject to a non-linear digital filtering in the feedback loop by filter 46.

The output signal from the non-linear digital filter 46 is in one embodiment two threshold values—a positive threshold value and a negative threshold value. These values are in turn coupled to the threshold setting terminals of the slicer 42. The threshold values are either an adjustment to the current threshold or a new threshold. Hence the slicer threshold values are dynamically adjusted, for instance at each recovered clock cycle, by the non-linear digital filter 46. Thereby any inadequacies in the equalization, slicer, or clock and data recovery circuit are overcome by the non-linear digital filter. Also, the gain in the equalizer is rendered unimportant, and no summer (which can introduce distortion) is needed in the feedback loop, unlike in the FIG. 1 arrangement.

In one embodiment, the last 32 data bits in the transmitted signal are stored and summed by filter 46. As in most digital systems, the clock signal is used only as a means to synchronize data. Since there are 32 bit values, each one of which has the digital value 0 or +1 or −1, the range of this sum is −32 to +32 which of course can conventionally be represented by 6 bits. However, 64 threshold levels are difficult to implement in an integrated circuit, so, a 6 bit value (−32 to 31) is rounded off to a value between 0 and 7 which can be represented by 3 bits. Furthermore if a nonlinear rounding scheme is used, switching noise due to changing thresholds is reduced by taking advantage of statistical knowledge of the sum, e.g., the sum is more likely to be near zero than near the extremes, so the "near zero" range is increased so that the threshold does not constantly change. This rounding of the threshold value from 6 digital bits to 3 digital bits is a non-linear filter function.

Figure 5:
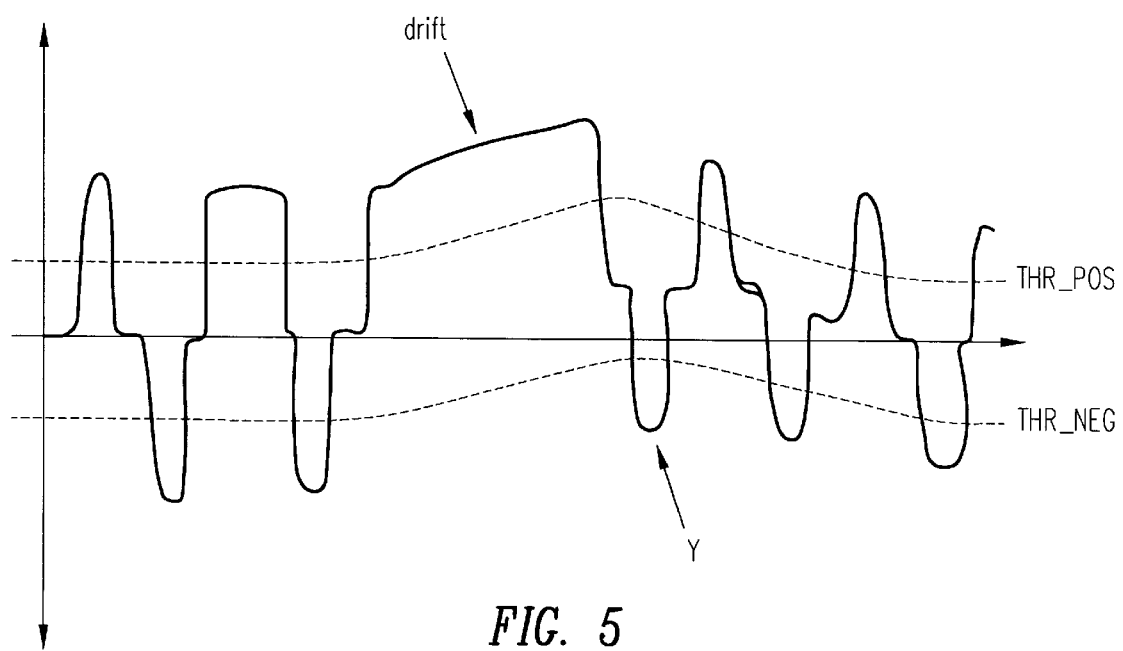
FIG. 5 shows operation of the FIG. 3 apparatus with modulated thresholds.
Figure 4:
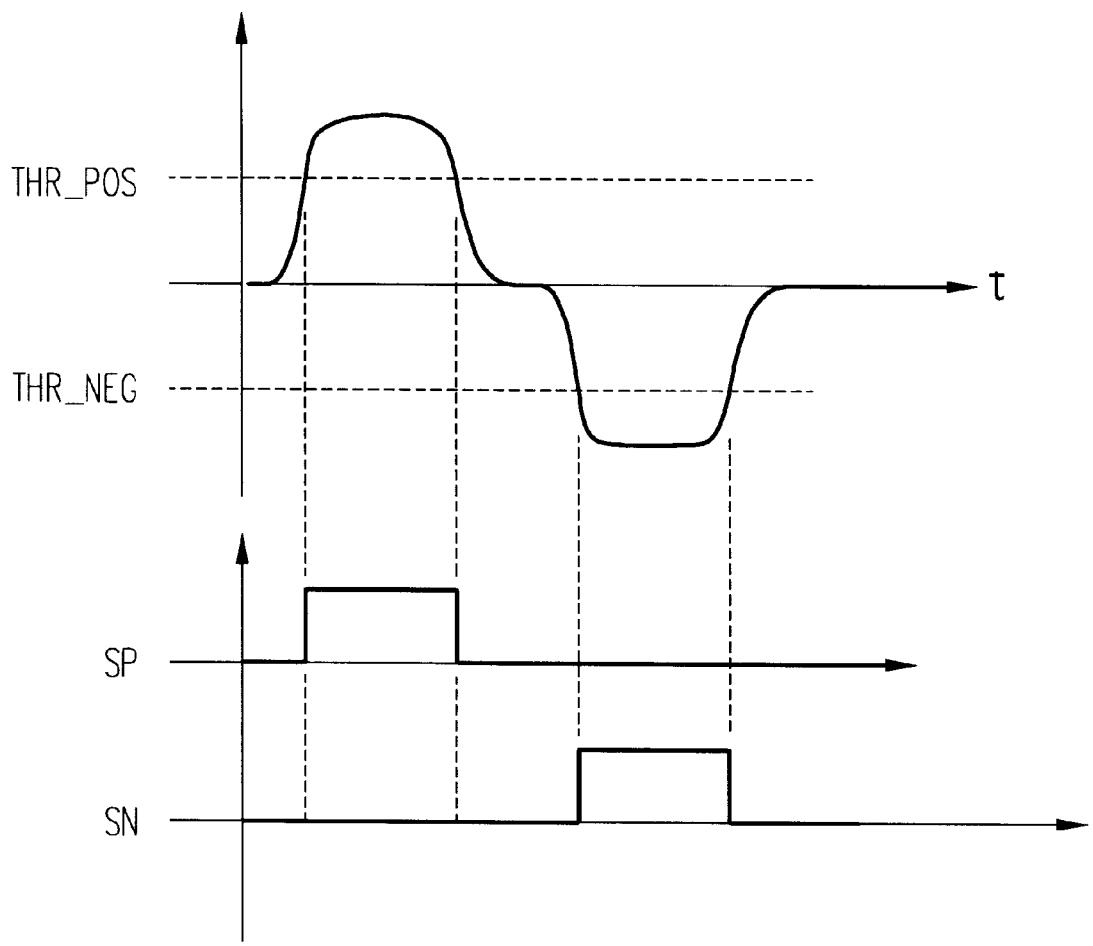
FIG. 4 shows graphically the use of thresholds for slicing a received signal.

The nature of the signals and the slicing threshold is better understood with reference to FIGS. 4 and 5. In FIG. 4, conventionally the vertical axes are voltage and the horizontal axis is time. The upper portion of FIG. 4 shows the Fast Ethernet MLT3 waveform of an incoming signal on the channel 16 having a positive going pulse and a subsequent negative going pulse. Each of these pulses is subject to slicing at a threshold value, where the positive threshold value is THR_PO and the negative threshold value is THR_NEG. These pulses are sliced by slicer 42 to provide the sliced pulses shown in the lower portion of FIG. 4, where the positive going sliced pulse is designated SP and the negative going sliced pulse is designated SN. The threshold values THR_POS, THR_NEG are variable in accordance with the invention.

Figure 2:
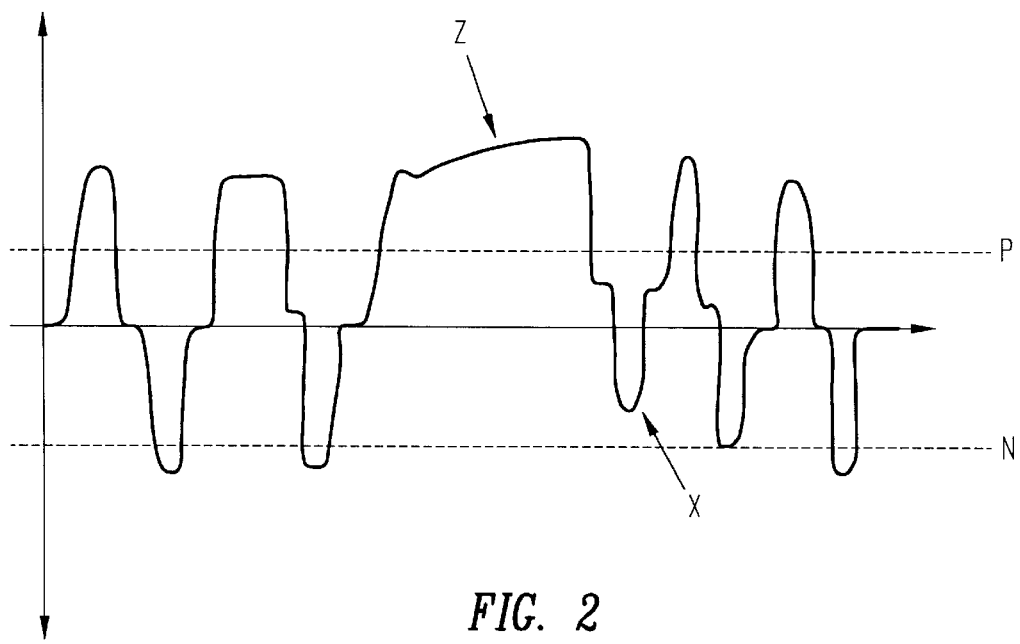
FIG. 2 shows prior art slicing at fixed thresholds.

FIG. 5 is similar to FIG. 2, but shows modulation of the slicer thresholds THR_POS and THR_NEG in accordance with the invention. The values of THR_POS and THR_NEG move together to track the signal amplitude, and the low amplitude pulse at point Y is beyond the value of THR_NEG, and so is detected. Note that while in Figures the signal amplitude is drifting due to poor equalization, the thresholds track this drift.

Figure 6:
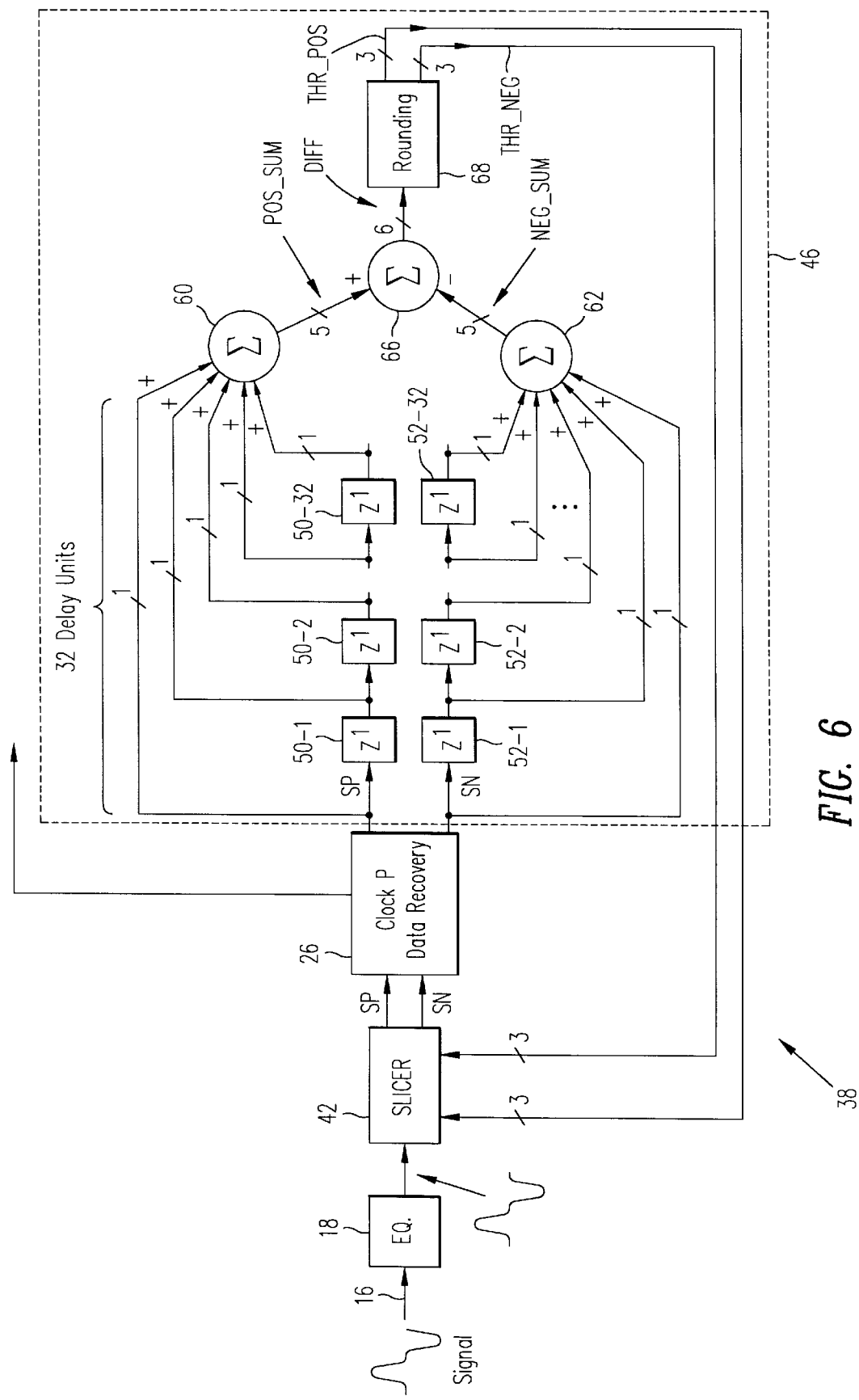
FIG. 6 shows detail of one embodiment of the apparatus of FIG. 3.

FIG. 6 shows detail of one embodiment of the receiver 38 of FIG. 3. The illustrated waveforms in FIG. 6 conform to those shown in the upper portion of FIG. 4, where the input signal on transmission line 16 is a positive going pulse followed by a negative going pulse. This signal is applied to the equalizer 18 which is e.g. a high pass filter. The filtered waveform of the signal output from equalizer 18 is shown. This equalized signal is then coupled to the slicer circuit 42. The output signals SP, SN of the slicer circuit are as shown in the lower portion of FIG. 4. Signals SP and SN are respectively applied to the input terminals of, in this case, 32 serially connected conventional delay units 50-1, 50-2, . . . , 50-32 and 52,1, 52-1, . . . 52-32 in filter 46. Each delay unit provides one clock cycle delay and is e.g. a shift register. There is an output tap from each delay unit. The signal from each output tap is as shown as a 1 bit signal.

These output taps are coupled to respectively conventional summers (adders) 60, 62. The output signals respectively POS_SUM and NEG_SUM from the summers 60, 62 are applied to a third summer 66 which takes POS_SUM from the positive threshold 60 summer and subtracts from that NEG_SUM from the negative threshold summer 62, to obtain an overall value DIFF. The output signal DIFF from summer 66 is a 6 bit value, e.g. −32 to +31 in two's complement representation. In order to provide a suitable input value and to reduce switching noise to the slicer, this 6 bit value is then subject to rounding by rounding element 68.

This rounding results in two 3 bit values, e.g. 0 to 7 for the positive threshold value THR_POS, and 0 TO 7 for the negative threshold THR_NEG. In one embodiment only one rounded value is computed and the other is derived from it. The two values are made to move together, with the signal being sliced to account for the known deficiency of non-ideal equalization shown in FIG. 5. These values THR_POS, THR_NEG are then fed back to respectively the two threshold setting terminals (ports) of the slicer 42. An example of the rounding by the rounding element 68 to produce THR_POS performed is shown in the following table where "DIFF" as in FIG. 6, is the 6 bit signed value −31 to +32 output by summer 66:

| if | −28 ≥ DIFF > −32 | then | THR_POS = 0 |
| if | −21 ≥ DIFF > −28 | then | THR_POS = 1 |
| if | −14 ≥ DIFF > −21 | then | THR_POS = 2 |
| if | −6 ≥ DIFF > −14 | then | THR_POS = 3 |
| if | 6 ≥ DIFF > −6 | then | THR_POS = 4 |
| if | 14 > DIFF > 6 | then | THR_POS = 5 |
| if | 22 ≥ DIFF > 14 | then | THR_POS = 6 |
| if | DIFF > 22 | then | THR_POS = 7 |

This of course is merely one example of rounding. As shown there are 8 positive threshold output values THR_POS, 0 through 7, which is a result of rounding the 6 bit value DIFF from summer 68 to 3 bits. THR_NEG is set as disclosed above to track THR_POS.

One embodiment of filter 46 is shown in the form of Verilog code in Appendix A (having pages 1–4) which is a portion of this disclosure. Verilog code is a conventional method of representing logic circuitry in the form of code rather than schematic drawings. This code shows the above-described rounding, summing, and processes to determine the thresholds. In this code the positive threshold value as above, is designated THR_POS and the negative threshold value, is THR_NEG. The positive signal pulse, as above, is designated SP and the negative signal pulse is SN. Summers 60, 62 in FIG. 4 output respectively the values POS_SUM and NEG_SUM, as above. DIFF in the code, as above, is the difference between POS_SUM and NEG_SUM Also, in this code the "casex" statement shows various "don't care" values and sets the values of THR_NEG.

In this example all filter coefficients on the taps POS [27] etc. are equal to 1. A set of filter coefficients used in another embodiment does not have equal weight coefficients for the filter taps and is shown in Appendix B where the filter coefficients have varying decimal (and corresponding hexadecimal) values for each of the 32 filter taps. The filter coefficients are chosen to modulate the threshold in accordance with known deficiencies in the equalizer as shown in FIG. 5.

It is to be appreciated that the particular embodiments shown here are not limiting but are illustrative. Also, while these embodiments are described herein mostly in "hardware" (circuit) terms, the present method and apparatus (and especially the digital filter) may be embodied as computer code to be executed on a suitable processor.

This disclosure includes copyrightable material; the copyright owner gives permission for facsimile reproduction of material in Patent Office files, but reserves all other copyright rights.

This disclosure is illustrative and not limiting; further modifications will be apparent to one skilled in the art in light of this disclosure and are intended to fall within the scope of the appended claims.

We claim:

1. A receiver comprising:
   an equalizer for receiving a signal;
   a slicer having a variable threshold value coupled to receive a signal output by the equalizer;
   a data recovery element coupled to receive the sliced signal; and
   a filter coupled to receive a signal output by the data recovery element and to feedback a value to the slicer, thereby to vary the threshold value of the slicer;
   wherein the filter is a non-linear digital filter which includes:
   a plurality of serially coupled delay elements;
   a tap coupled to each delay element; and
   a summer coupled to each of the taps.

2. The receiver of claim 1, further comprising a rounding element coupled to the summer to round an n bit output by the summer to m bits, where m is less than n.

3. The receiver of claim 1, wherein the summer separately sums for positive pulses and negative pulses in the signal.

4. The receiver of claim 3, wherein the filter feeds back to the slicer a value to vary a positive threshold and a value to vary a negative threshold.

5. The receiver of claim 2, wherein n=6 and m=3.

6. A receiver comprising:
   an equalizer for receiving a signal;
   a slicer having a variable threshold value coupled to receive a signal output by the equalizer;
   a data recovery element coupled to receive the sliced signal; and
   a filter coupled to receive a signal output by the data recovery element and to feedback a value to the slicer, thereby to vary the threshold value of the slicer;
   wherein the value is fed back at each clock cycle of the slicer.

7. The receiver of claim 1, wherein the equalizer is an analog equalizer circuit.

8. A receiver comprising:
   an equalizer for receiving a signal;
   a slicer having a variable threshold value coupled to receive a signal output by the equalizer;
   a data recovery element coupled to receive the sliced signal; and
   a filter coupled to receive a signal output by the data recovery element and to feedback a value to the slicer, thereby to vary the threshold value of the slicer;
   wherein the filter has non-equal weighting coefficients associated with each tap.

9. The circuit of claim 8, wherein the weighting coefficients are all equal.

10. A method of equalizing a received signal in a communications system; comprising:

equalizing the received signal in the analog domain;

slicing the equalized signal;

recovering clock and data signals from the sliced signal; and dynamically altering a threshold value for the step of slicing; where the altering comprises:

non-linearly digital filtering the recovered signals; and feeding back the filtered signals as a threshold value; and wherein the threshold value is fed back at each clock cycle of the slicing.

* * * * *